March 24, 1931.  J. M. SPANGLER  1,798,045
HAYSTACKER
Filed May 14, 1928  4 Sheets-Sheet 1

John M. Spangler,
INVENTOR

BY Victor J. Evans
ATTORNEY

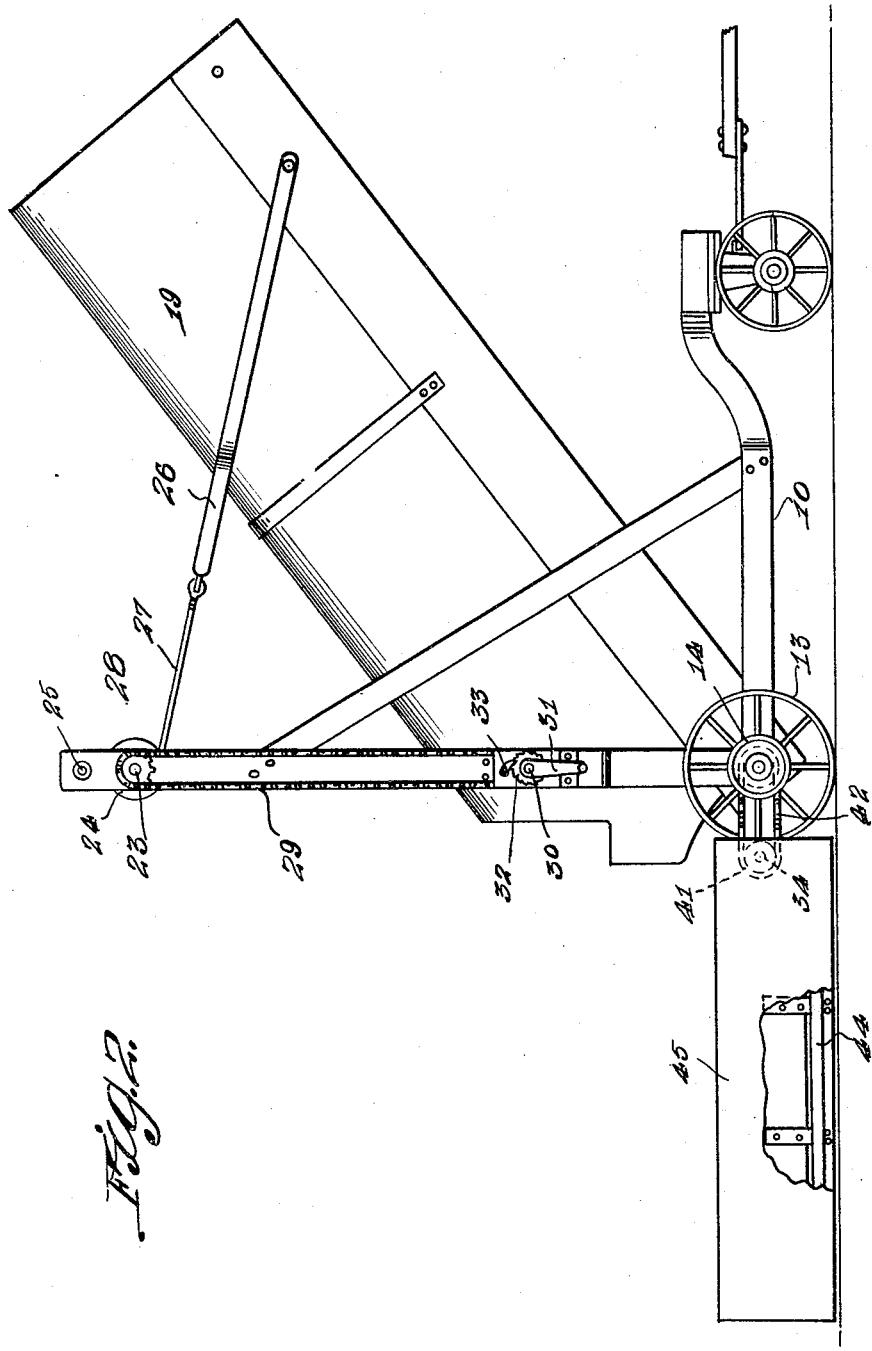

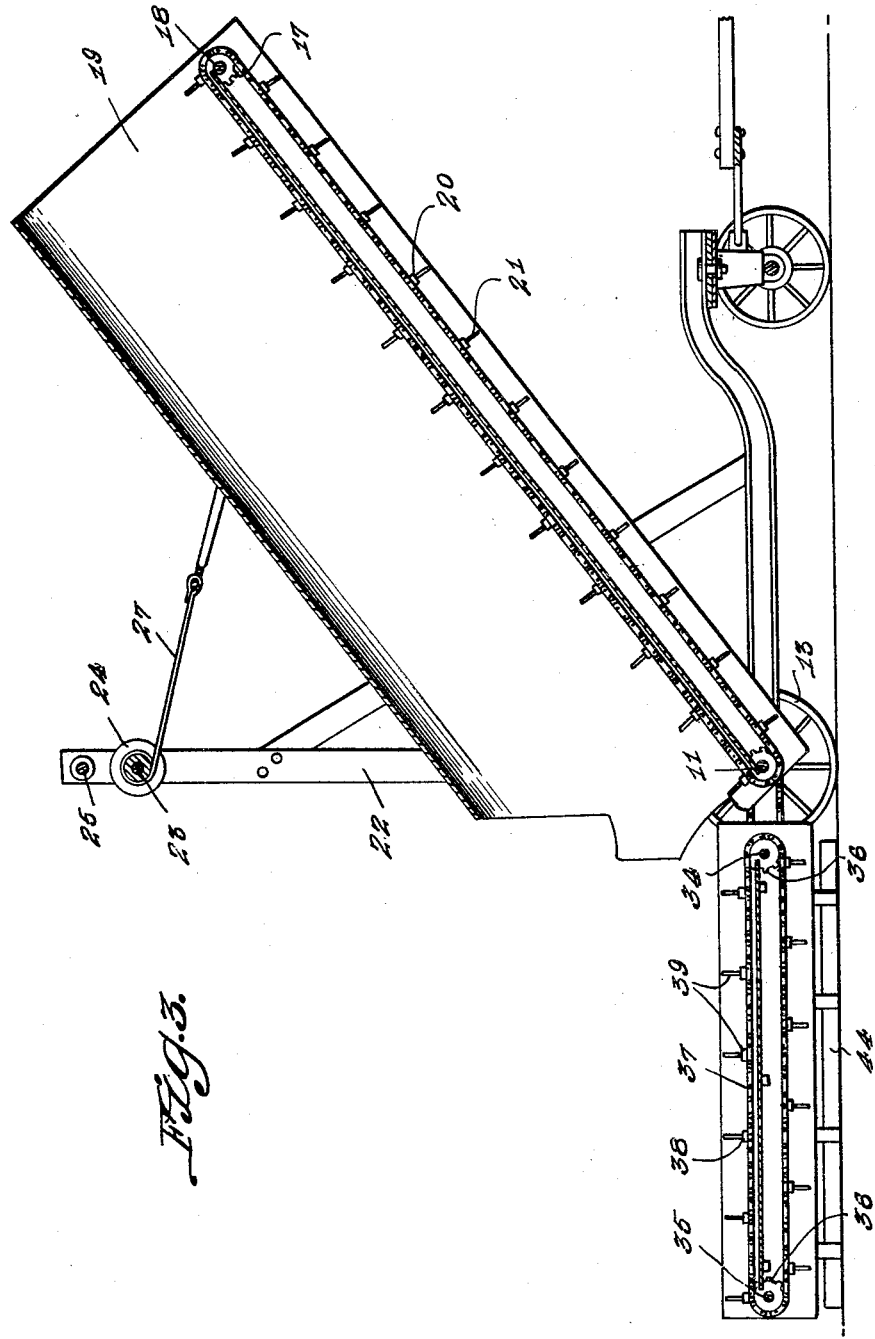

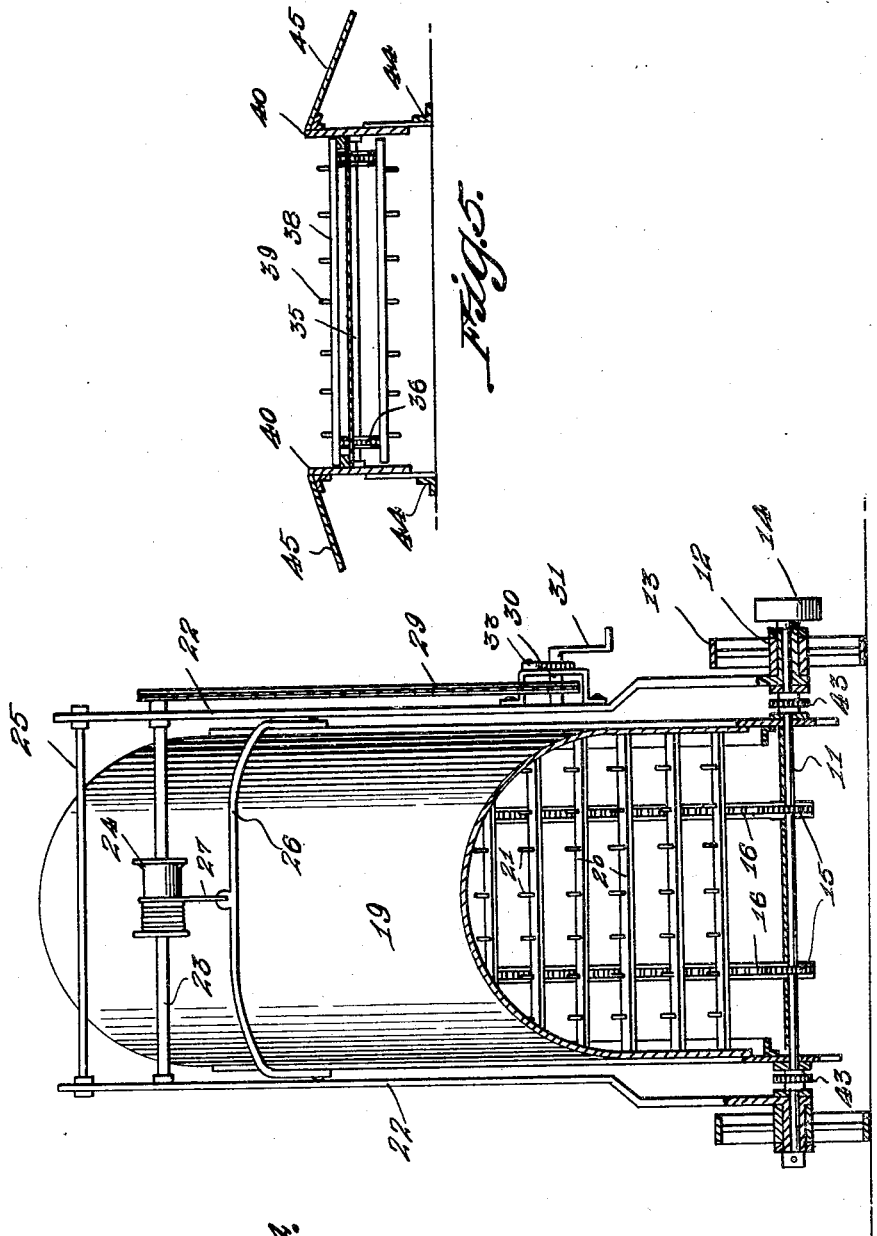

Patented Mar. 24, 1931

1,798,045

UNITED STATES PATENT OFFICE

JOHN M. SPANGLER, OF MERRYFLAT, SASKATCHEWAN, CANADA

HAYSTACKER

Application filed May 14, 1928. Serial No. 277,546.

This invention relates to hay stackers and has for its object the provision of a machine adapted to be operated by power, and designed to handle large quantities of hay which can be stacked at any desired height in a comparatively short period of time, with a minimum of effort.

In carrying out the invention I contemplate a machine of the above mentioned character which embodies a horizontal conveyor to which the hay to be stacked is fed, this conveyor being arranged to transfer the hay to a second endless conveyor capable of being quickly and easily adjusted to any desired inclination, and held in its given position so that the hay can be stacked at the desired height.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a plan view of the machine.

Figure 2 is a side elevation showing the adjustable endless conveyor in an elevated position.

Figure 3 is a sectional view on line 3—3 of Figure 1.

Figure 4 is a rear elevation partly in section.

Figure 5 is a transverse sectional view across the horizontal endless conveyor.

Referring to the drawings in detail 10 indicates the wheeled frame of the machine which may vary in size and construction without departing from the spirit of the invention, and which may be moved over the ground or surface by any suitable means. Arranged at the rear of the frame is an axle 11 which extends across the entire width of the frame and journaled in the hubs 12 of the ground wheels 13 of the frame. The axle is provided with a belt wheel or pulley 14 at one or both ends inasmuch as the axle is adapted to be driven by power through the instrumentality of a suitable belt not shown. The axle 11 is also provided with spaced sprockets 15 over which are trained the endless chains 16 forming part of an endless conveyor, these chains being also trained over sprockets 17 carried by a shaft 18 journaled in the forward end of the hood or cover 19 for said conveyor. These chains support transverse slots 20 from each of which extend pointed prongs 21 which together with the chains constitute the endless conveyor. The conveyor in its entirety is covered by a suitable hood or shield 19 clearly illustrated in Figures 1 and 3, and this hood and endless conveyor are mounted on the axle 11 for vertical pivotal movement so that the conveyor can be arranged at any desired inclination with a view to stacking the hay at any particular height.

While any suitable means may be employed for adjusting this endless conveyor in the manner just stated, I preferably employ a pair of spaced uprights 22 which rise from the axle 11 and which uprights support a transverse shaft 23 carrying a drum 24. These upright are also connected together at their upper ends by a transverse shaft 25 as clearly illustrated in Figure 4 to strengthen and reinforce the construction. A yoke 26 is associated with the hook 19 of the conveyor and has terminally connected therewith one end of a cable 27, the other end of which is connected with the drum 24 so that the cable can be wound about or unwound from the drum as the occasion may require. For this purpose the shaft 23 projects beyond one of the uprights 22 and supports a sprocket 28 over which is trained an endless chain 29, and which chain is also trained over a sprocket carried by the shaft 30 journaled on the same upright 22. The shaft 30 is provided with a crank handle 31, so that the chain 29 can be turned in either direction and thereby rotate the shaft 23 in the proper direction to either wind the cable 27 about the drum to elevate the endless conveyor and hook 19, or to unwind the cable from the drum and thus permit the endless conveyor and hood to be lowered. The shaft 30 is also provided with a ratchet 32 with which a pawl 33 cooperates to prevent retrograde movement of the drum.

Arranged directly behind the wheeled frame 10 is a horizontal conveyor including the spaced shafts 34 and 35 respectively each being provided with sprockets 36 over which are trained endless chains 37. These chains are connected by cross bars 38 from each of which extend pointed prongs or the like 39. The shaft 34 extends beyond the side members 40 constituting the frame for said conveyor and carry sprockets 41 over which are trained short endless chains 42, these chains being also trained over sprockets 43 carried by the axle 11 above referred to. Consequently the chains 42 are utilized to transmit motion to the horizontal endless conveyor from the vertically adjustable conveyor hereinabove described. Supported by the side members 40 are runners 44 which engage the ground and support the endless conveyor suitably spaced therefrom. Also carried by the side members 40 of the frame and extending in opposite directions are downwardly inclined platforms 45 upon which the hay is deposited and subsequently moved from said platform onto the horizontal conveyor. These platforms are preferably hinged on the side members 40 so that they can be folded on the conveyor when not in use. The horizontal conveyor may also be elevated and supported in any suitable manner above the ground while the machine is being moved from place to place.

In practice the hay is delivered to the horizontal conveyor over the platforms 45 by sweep rakes or in any other suitable manner, the horizontal conveyor transferring the hay to the adjustable conveyor as will be readily understood. This latter mentioned conveyor can be easily and conveniently raised to the desired inclination so that the hay can be stacked at any desired height, and in this manner a large quantity of hay can be handled and stacked with a minimum of time and effort.

While it is believed that from the foregoing description the nature and advantages of the invention will be readily understood, I desire to have it known that I do not limit myself to what is herein shown and described and that such changes may be resorted to when desired as fall within the scope of what is claimed.

What is claimed is:

In a hay stacking machine of the character described, a wheeled frame including an axle, sprockets carried thereby, a substantially semi-cylindrical shaped hood pivotally mounted upon the axle and open at both ends, a shaft journaled between the opposed walls of said hood adjacent the forward extremity thereof, sprockets carried by said shaft, an endless conveyor trained over the last mentioned sprockets and the sprockets carried by the axle, with said conveyor wholly disposed within the hood and coextensive in length therewith, spaced parallel standards rising from the axle at opposite sides of the hood, a drum journaled between the standards, a flexible element adapted to be wound about and unwound from the drum, a yoke connected with the hood, and flexible elements whereby the hood and said conveyor can be raised and lowered as a unit with relation to the ground, means for operating said drum, and means for preventing retrograde movement of the drum for holding the conveyor and hood in a given position.

In testimony whereof I affix my signature.

JOHN M. SPANGLER.